US006873967B1

(12) United States Patent
Kalagnanam et al.

(10) Patent No.: US 6,873,967 B1
(45) Date of Patent: Mar. 29, 2005

(54) ELECTRONIC SHOPPING ASSISTANT AND METHOD OF USE

(75) Inventors: Jayant R. Kalagnanam, Tarrytown, NY (US); Ying Tat Leung, Tarrytown, NY (US); Andrew J. Davenport, Ossining, NY (US); Juhnyoung Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 09/617,496

(22) Filed: Jul. 17, 2000

(51) Int. Cl.$^7$ .............................................. G06F 17/60
(52) U.S. Cl. ........................................ 705/26; 705/27
(58) Field of Search ................. 705/26, 27; 364/479.01; 707/3, 10, 104.1

(56) References Cited

U.S. PATENT DOCUMENTS

| | | | |
|---|---|---|---|
| 4,866,661 A | | 9/1989 | de Prins |
| 5,113,496 A | | 5/1992 | McCalley et al. |
| 5,202,010 A | | 4/1993 | Deaton et al. |
| 5,383,111 A | * | 1/1995 | Homma et al. ............... 705/27 |
| 5,717,923 A | * | 2/1998 | Dedrick ....................... 705/10 |
| 5,754,981 A | * | 5/1998 | Veeneman et al. ............ 705/26 |
| 5,758,328 A | * | 5/1998 | Giovannoli .................. 705/26 |
| 5,761,648 A | | 6/1998 | Golden et al. |
| 5,774,874 A | | 6/1998 | Veeneman et al. |
| 5,877,759 A | * | 3/1999 | Bauer ........................ 345/708 |
| 5,898,594 A | * | 4/1999 | Leason et al. ......... 364/479.01 |
| 5,926,798 A | * | 7/1999 | Carter ......................... 705/26 |
| 5,951,642 A | * | 9/1999 | Onoe et al. .................. 709/224 |
| 6,119,101 A | * | 9/2000 | Peckover ..................... 705/26 |
| 6,125,353 A | | 9/2000 | Yagasaki |
| 6,167,383 A | * | 12/2000 | Henson ....................... 705/26 |
| 6,286,002 B1 | * | 9/2001 | Axaopoulos et al. ......... 707/10 |
| 6,295,530 B1 | | 9/2001 | Ritchie et al. |
| 6,317,761 B1 | | 11/2001 | Landsman et al. |
| 6,356,898 B2 | | 3/2002 | Cohen et al. |
| 6,381,597 B1 | * | 4/2002 | Lin ............................... 707/3 |
| 6,397,226 B1 | * | 5/2002 | Sage ........................ 707/104.1 |
| 6,484,165 B1 | * | 11/2002 | Beall et al. .................... 707/3 |

FOREIGN PATENT DOCUMENTS

| | | | | |
|---|---|---|---|---|
| GB | 2 328 530 A | * | 2/1999 | ........... G06F/17/60 |
| GB | 2328530 A | * | 2/1999 | ........... G06F/17/60 |

OTHER PUBLICATIONS

"Shopbots and Pricebots" by Amy R. Greenwald and Jeffrey O. Kephart; IBM Institute for Advanced Commerce presented at an IEEE Conference in Jul. 1999.*

"Gifts.com" screen shots captured via the WayBackMachine and dated Feb. 29, 2000.*

* cited by examiner

*Primary Examiner*—Jeffrey A. Smith
*Assistant Examiner*—Rob Rhode
(74) *Attorney, Agent, or Firm*—Whitham, Curtis & Christofferson, P.C.; Stephen C. Kaufman (57) ABSTRACT

A computer system provides one or more lists of product combinations to one or more shoppers over one or more networks. The computer system comprises one or more central processing units (CPUs), one or more memories, and one or more network interfaces to one or more networks. An electronic shopping assistant process implemented on the computer system receives one or more inputs of constraints from shoppers, sends out the inputs to one or more shopping list generating processes in one or more stores, receives one or more lists of recommended product combinations that satisfy the given constraints, and allows shoppers to view and select one or more product combinations from received lists. A shopping list generating process implemented on the computer system receives one or more inputs from the electronic shopping assistant process by using an electronic shopping list protocol, searches products in an online product catalog stored in a product database, computes one or more lists of product combinations that satisfy the constraints given in the input, and sends lists of product combinations back to the electronic shopping assistant process again by using the electronic shopping list protocol.

21 Claims, 7 Drawing Sheets

FIG. 1

MAPP TABLE (BRIDGING TABLE) 300

| | LIST OF ES ON LAN, AND OTHER INFORMATION | INPUT - INTERFACE 302 | CREATION TIME 340 |
|---|---|---|---|
| 304 | | ALL INTERFACES BRIDGED INTO ONE BROADCAST DOMAIN | |
| 306 | FOR SRB NETWORKS ATTACHED TO AN INTERFACE MAC ADDRESS - PRIORITY - RIF LIST FOR EACH ES ATTACHED TO A BRIDGE INTERFACE | | |
| 308 | TRMAC ES11-P-RIF; TRMAC ES12-P-RIF; TRMAC ES13-P-RIF;... TRMAC ES1N(1)-P-RIF | SRB- port1 | TM_T1 |
| 310 | TRMAC ES21-P-RIF; TRMAC ES22-P-RIF; TRMAC ES23-P-RIF;... TRMAC ES2N(2)-P-RIF | SRB- port2 | TM_T2 |
| | TRMAC ES31-P-RIF; TRMAC ES32-P-RIF; TRMAC ES33-P-RIF;... TRMAC ES3N(3)-P-RIF | SRB- port3 | TM_T3 |
| 320 | FOR ETHERNET NETWORKS ATTACHED TO A BRIDGE INTERFACE MAC ADDRESS - PRIORITY | | |
| 322 | EMAC ES11-P;...; EMAC ES12-P ...; EMAC ES13-P ...;... EMAC ES1N(1)-P ... ... etc. ... | ETHERNET1 - port ... etc. ... | TM_E1 |
| 330 | OTHER LANs IN THE BROADCAST DOMAIN CONNECTED LOCALLY TO BE BRIDGED AT A BRIDGE INTERFACE | | |
| | EMAC ES11-P;...; EMAC ES12-P ...; EMAC ES13-P ...;... EMAC ES1N(1)-P ... ... etc. ... etc. ... etc. ... | FDDI1 - port | TM_X1 etc. |

ELECTRONIC SHOPPING ASSISTANT AND METHOD OF USE

BACKGROUND OF THE INVENTION

1. Field of the Invention

The present invention generally relates to shopping over a computer network and, more particularly, to shopping over the Internet where a computer program system helps shoppers select and purchase one or more groups of products from different online network sites, e.g., online stores while satisfying various preference and budget constraints.

2. Background Description

Commerce over networks, particularly e-commerce over the Internet, has increased significantly over the past few years. Part of e-commerce enables users and shoppers to access information of products and to purchase them from various commercial Web sites (i.e., online stores). There are numerous online stores currently operating in the Internet including. Amazon.com, eToys.com, Buy.com, Wal-Mart.com, Sears.com, LLBean.com, Gap.com, Macys.com, JCPenny,com, Eddiebauer.com, and Onsale.com. These online stores provide various customer services to make commerce activities possible over Web sites. Some of the examples of the basic services are online catalogs of merchandise which are both browsable and searchable by various product attributes (e.g., keyword, name, manufacturer, and model number), shopping carts, and checkout process. Some online stores also provide advanced customer services such as product recommendations, wish list, gift registries, gift finders, gift-click, gift certificates, calendars, custom-configuration of products, express checkout buyer's groups, chatting, e-mail notification, and in-context sales.

Web based retailing (e-tailing) has to date largely tried to mimic the business model used by brick-and-mortar retailers. As a consequence, cyber shopping using web catalog has been restricted to traditional "shopping basket" models. Such a business does not fundamentally exploit the information technology infrastructure that becomes available with Web based shopping. For example, although a potential user might be interested in different shirts and four pants, he might finally want to choose two shirts and two pants that fall within a budget constraint. Similarly, when gift shopping for friends and family during the Christmas season, a shopper might identify, based on attribute preference categories, a set of items but desire to identify one gift item per person based on budget constraints. The traditional shopping cart-based approach is not sensitive to a user's preference structures.

The present invention relates to shopping over the Internet where a computer program product helps shoppers select and purchase one or more groups of products from one or more online stores. The computer program product generates a list of recommended products while taking into account different types of constraints on the products including budget, product category, inter-item and multiple choice constraints, as well as possible optimization criteria such as retailer preferences. Such a computer program product can be useful in many occasions in life, including when a shopper purchases gifts for one or more people, say, friends and relatives, for a holiday, when a shopper purchases a number of school and education-related materials during a back-to-school season, when a student shopper purchases a number of books in the beginning of a semester, when a home owner purchases materials for remodeling part of his or her home, say, a kitchen, when an office manager periodically, say, one a month, buys various office supplies for his or her office, and when a restaurant manager orders food materials for his or her restaurant.

While consumers have occasions to purchase a group of products from time to time, purchasing groups of products at a time for an operation or a project is a norm for business buyers. A computer program product which generates a list of recommended products optimized for a given set of constraints will provide such bundle buyers with a new shopping experience that saves them both time and cost, and improves their satisfaction. A computer program product which recommends a group of products optimized for a given set of constraints is currently not available in existing online stores in the Internet. Some online stores provides several shopping tools for selecting and buying one or more products such as wish lists, gift registries, gift-finders, and gift-click. How these shopping tools work and how they are different from the present invention is summarized below.

A wish list is a shopping tool available in a number of online stores including Amazon.com, Eddiebauer.com, and Sears.com. A shopper can create a wish list in online store and record information on products he or she wants to buy from the store in the list. The store keeps the product information for a definite period of time, e.g., a year. The shopper can access the list anytime and make one or more transactions for purchasing one or more products stored in the list. Some online stores such as Amazon.com extend their shopping cart service to provide the wish list capability to some degree. However, such shopping carts store the product information for a shorter period of time, e.g., ninety days. A wish list helps its users purchase a product bundle at one time from an online store. It is different from the present invention because it requires the users to choose a list of products to buy, and does not select a list of products optimized for various constraints such as budget and product preferences.

A gift registry is another popular shopping tool provided by several online stores including Macys.com, and JCPenny.com. A user (or a group of users, e.g., a marrying couple) can create a gift registry account for a special occasion such as wedding, anniversary, pregnancy, holiday, birthday, or graduation in an online store and collect a list of products the user wants to receive as gifts. Other people (e.g., the gift registry owner's friends and relatives) can access the gift registry list by using the owner's personal information such as owner's name(s) and occasion date, examine products stored in the list, and purchase one or more products in the list for the owner. A gift registry helps its users obtain a group of products for a special occasion, but it is different from the present invention primarily because it requires the user to choose a list of products to buy. A gift registry does not select products optimized for various constraints though it may provide the users with some information useful for the selection. Also, it requires the users, friends and relatives to access the registries and purchase one or more products on the list.

A gift finder is another shopping tool provided by online stores such as Eddiebauer.com. A gift finder is a parametric search program customized for selecting gifts. That is, a gift finder provides users with a set of parameters (e.g., gift recipient's sex and age, occasion, and price range), and their possible values (e.g., wedding, birthday, or anniversary for the occasion parameter). A user can select values for one or more of the given parameters to find products of interest available in the online store. A gift finder can be used to select a group of products which possibly satisfy the selected values for the given parameters. Unlike the present invention, however, a gift finder require the parameter values set for each gift product, and so it requires multiple searches to select a group of products. Also gift finders usually come with only a small number of parameters which generally fit in various types of occasions, and so they can hardly cover diverse constraints of individual shopping cases.

A gift-click is a new shopping tool served by Amazon.com. When a user finds in an online store a product which he or she wants to send as a gift to a person he or she knows, the user purchases the product and provides the person's e-mail address to the store. Then the store contacts the person via e-mail to arrange delivery, i.e., confirm if the person intend to accept the gift, find the person's mailing address and send out the gift. This tool helps the user send gifts to other people, but it does not help shoppers select a group of products optimized for a set of given constraints.

Another prior art area for this invention is constraint-based configuration programming which was recently developed from the field of artificial intelligence. Constraint-based configuration provides a rich representation for expressing relationships and constraints between objects, as well as efficient techniques for constraint propagation and enumeration of solutions. Constraint-based configuration technology allows the online product catalog to be represented declaratively by a hierarchy of dynamic classes, each corresponding to a product type. For each item choice, the input profile specifies a possible domain, or list of items in the product catalog which can match this profile. Constraint-based optimization provides fast and efficient algorithms for generating lists of recommended products for each item choice which satisfy all the shopping list constraints.

SUMMARY OF THE INVENTION

It is therefore an object of the present invention to provide an electronic shopping assistant to help shoppers who are shopping for multiple items.

According to the invention, there is provided a computer system for providing one or more lists of product combinations to one or more shoppers over one or more networks. The system comprises one or more central processing units (CPUs), one or more memories, and one or more network interfaces to one or more networks. An electronic shopping assistant process receives one or more inputs of constraints from shoppers, sends out the inputs to one or more shopping list generating processes in one or more stores, receives one or more lists of recommended product combinations that satisfy the given constraints, and allows shoppers to view and select one or more product combinations from the given lists. A shopping list generating process receives one or mote input from the electronic shopping assistant process by using an electronic shopping list protocol, searches products in an online product catalog stored in a product database, computes one or more lists of product combinations that satisfy the constraints given in the input, and sends the lists of product combinations back to the electronic shopping assistant process again by using the electronic shopping list protocol.

The electronic shopping assistant according to the invention enhances cyber shopping by providing a new suite of shopping tools which allows for the development of a new and enriching relationship between the customer and retailer. The electronic shopping assistant provides customers the facility of examining the catalog using preference filters, creating gift lists (e.g., for the Christmas season) in a semi-automated way and using financial instruments such as limit orders to minimize cost for a item bundle of interest. The retailers benefit enormously in that these tools elicit from customers the price point for various items thereby providing a wealth of information for scheduling promotion and sales to maximize profit.

The target owner of electronic shopping assistant (the store) is a retailer in any segment who is:
1. an online, Web-based direct marketer, or
2. a traditional brick-and-mortar store with an electronic, online catalog available to the customers, such as that in kiosks or in electronic store directories.

The electronic shopping assistant is provided to the shoppers (the end users) to enhance the value-add of the store by:
1. providing a convenient shopping service to save customers time and effort;
2. enhancing the overall shopping experience.

The business benefits of the electronic shopping assistant to the store are:
1. It provides a new way to selectively promote the products carried, which is in addition to and can be used simultaneously with the traditional ways of promotion such as advertising, markdowns, or in-store displays.
2. This service would be difficult to duplicate for stores without an electronic, online product catalog and therefore would represent a certain degree of store differentiation and competitive advantage.
3. It takes advantage of the unique capabilities of an electronic product catalog and enhances the return in investing in developing such a catalog.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
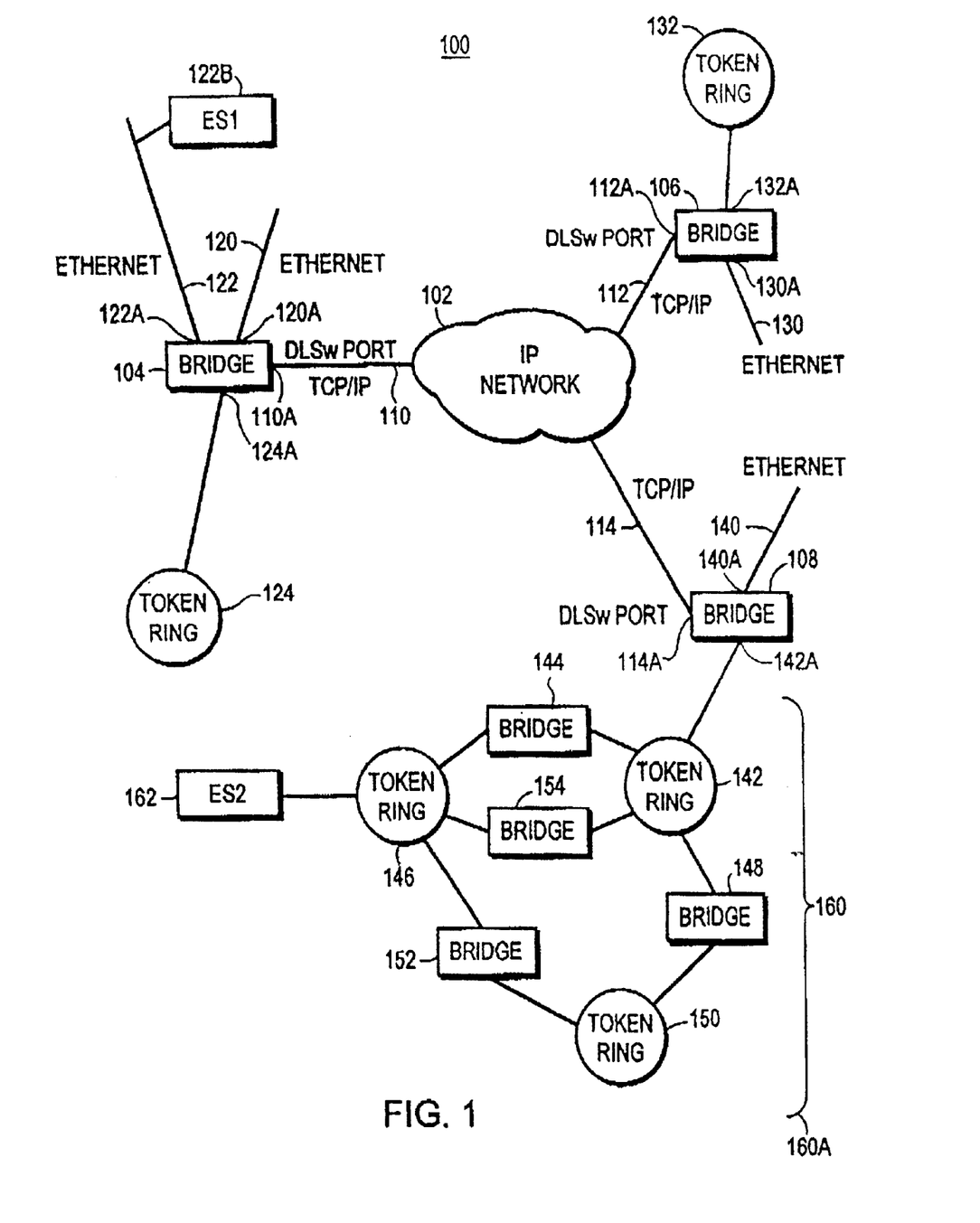
FIG. 1 is a block diagram of one preferred system architecture according to the invention.

Referring now to the drawings, and more particularly to FIG. 1, there is shown a block diagram of one preferred system architecture of the electronic shopping assistant, showing one or more shoppers 101, one or more computers 102 used by the shoppers, an online product catalog 103 accessed by a Web browser and used by the shoppers, a computer network 110, such as the Internet, and one or more online store servers 112 in the network for one or more online stores in the network. The online product catalog 103 includes one or more product identification numbers, a product name, one or more product categories, one or more product attribute values including product size, product color, product price, product gross margin percentage, on-hand inventory in weeks of supply, and one or more priority indices including priority index by margin, priority index by inventory, and an overall priority index. The priority index of a product is an attribute of a product that represents a store's preference for selling in comparison to other products in the store.

Figure 7:
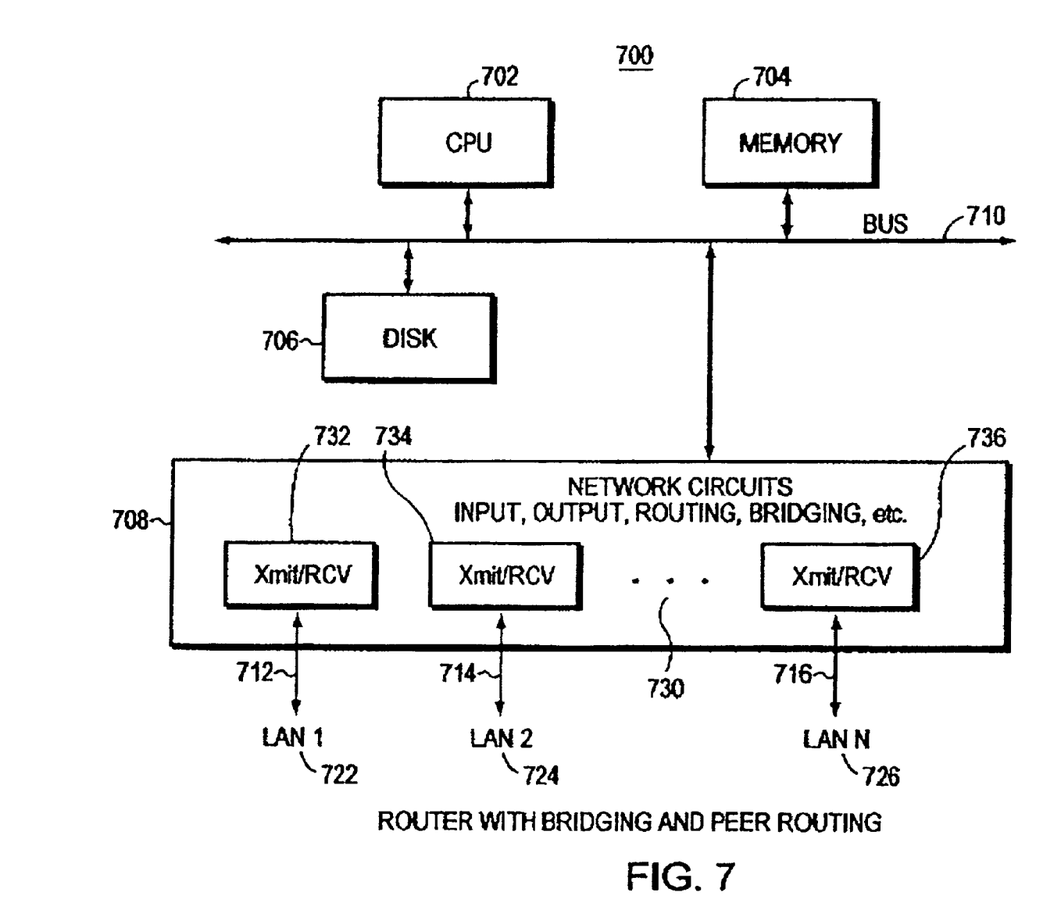
FIG. 7 is an example of product records stored in the database of a store server.

A shopping list generator process 113 runs on the online store servers 112. The shopping list generator process 113 is a component of the electronic shopping assistant process 104 that searches products in an online product catalog stored in a product database 114, and computes one or more lists of product combinations that satisfy the constraints given in the input. Thus, the electronic shopping assistant process 104 and the shopping list generator process 113 may be viewed as a client/server application process with the shopping list generator process 113 being the back end process and the electronic shopping assistant process 104 being the front end process. The database 114 accessed by the online store servers 112 contains product records 115 that are used to generate a shopping list based on a shopper's input. An example of product records 115 stored in database 114 is shown in FIG. 7. As seen in FIG. 7, the product database stores one or more product identification numbers, one or more product records 115, each of which stores one or more product identification numbers, one or more product names, one or more product categories, one or more product attribute values including product size, product color, product price, product gross margin percentage, on-hand inventory in weeks of supply, and one or more priority indices including priority index by margin, priority index by inventory, and an overall priority index.

The computer 102 many be a personal computer (PC) or a computer terminal installed in a kiosk. The electronic shopping assistant 104 installed on the computer includes an input handler 105 and an output handler 106 for respectively communicating a request and receiving a reply over the network 110 using an electronic shopping list protocol. The electronic shopping list protocol allows the sending and receiving of one or more inputs of constraints and one or more outputs of lists of recommended product combinations, between one or more electronic shopping assistant processes and one or more shopping list generating processes over one or more networks. The electronic shopping list protocol is a network protocol that the electronic shopping assistant and shopping list generating processes use to communicate with each other over the network. Because the electronic shopping list process is running on the Web server 112 of an online store on the Internet, the processes communicate with each other by using the Hyper-Text Transfer Protocol (HTTP). The electronic shopping list protocol comprises a set of types and format of data sent back and forth between the electronic shopping assistant and the shopping list generating processes on top of HTTP. The input handler 105 receives input 107 from a shopper 101. This input includes such information as item choices, profiles, constraints, and limit price. The profile constraints provide information about one or more recipients of products for which the shopper shops, the recipient information comprising an identification including name, gender, age and address, and product information including category, size, color and brand, and budget information. The shopping list constraints comprise one or more budget constraints that specify one or more conditions on a cost for individual product recipients and a total cost, one or more product constraints that specify one or more conditions for product attributes including category, size, color and brand, one or more inter-item constraints that specify one or more conditions on a relationship among products and their attributes, and one or more multiple choice constraints that specify one or more conditions on a number of products given to recipients. The limit price is an offer by a shopper to buy a product item at a suggested price with an expiry date. The output handler 106 provides recommended product lists 108 to the shopper 101. The recommend product lists include feasible item bundles based on the shopper's input constraints, limit price, etc. The list of product combinations may also comprise one or more products sold in one or more online stores that satisfy the constraints given by the electronic shopping assistant as a set. The electronic shopping assistant process compiles one or more lists of recommended product combinations received from one or more stores, to create one or more recommended product lists and displays one or more lists of recommended product combinations to shoppers. The electronic shopping assistant process provides an interactive interface for a shopper allowing the shopper to browse one or more lists of feasible product bundles with products presented in one or more online product catalogs, and tag one or more products in the lists and the catalog. Using this interface, a shopper submits an input including one or more products tagged from the online product catalog and the feasible product bundles in a previous submission.

Figure 2:
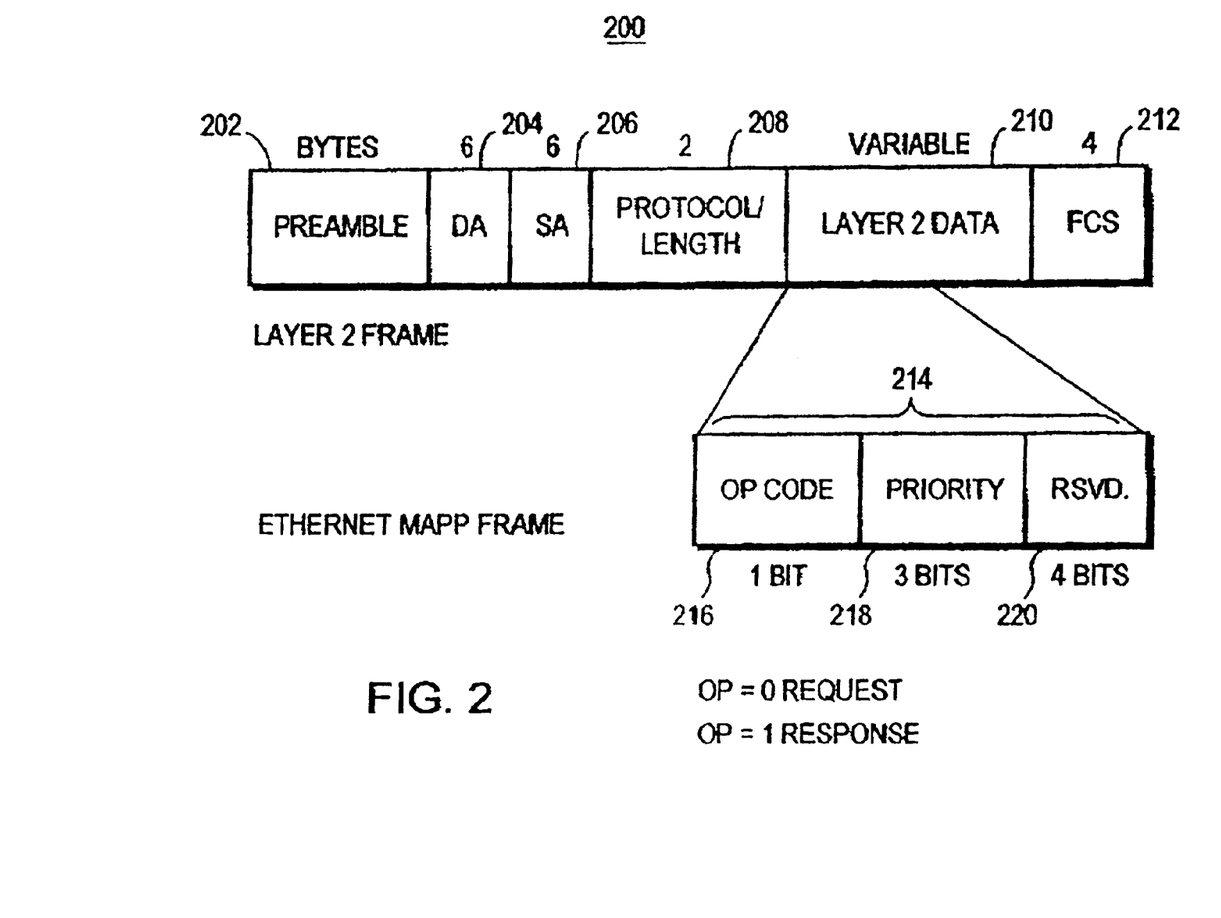
FIG. 2 is a block diagram of one preferred system architecture which used handheld shopping assistants.

An alternative embodiment shown in FIG. 2 contemplates the use by the shopper 101 of a hand held shopping assistant 201 in a physical store 202, as opposed to an online store. The shopping assistant 201 may take the form of a personal digital assistant (PDA) having a bar code scanner 203 capable of reading the Universal Product Code (UPC). In this case, the shopper carries the shopping assistant 201 around the store and, upon selecting a product 204, simply scans the bar code on the tag applied to the product. The scanned code is input to a "shopping basket" 205, typically software program storing product identifications in cache memory in the shopping assistant 201. In other words, instead of browsing a store's online product catalog, the shopper views actual samples of the products in the physical store and makes a selection by scanning the bar code of a label applied to the product. When the shopper has finished shopping, or at any time during the process of shopping, the shopper 101 takes the hand held shopping assistant 201 to the computer 102, installed for example in a kiosk in the physical store 202, and uploads the product identifications stored by the "shopping basket" to the input 107A of the computer 102. This may be accomplished by a physical connection (e.g., a serial port or "firewire" connection) or a wireless connection, typically an infrared (IR) port.

Such a "shopping basket" can then be used in a variety of ways: (i) To construct constrained limit orders as discussed above or (ii) to identify additional products from a Web catalog that match specific items in the list. Such a facility would tremendously enhance the shopping experience of a shopper by integrating the advantages of the real with the cyber aspects of shopping. It would also present a tremendous benefit to the brick-and-mortar retailers since their Web catalogs can now be mapped to a shopping experience. On the down side is the danger (for retailers) that shoppers might construct a basket while experiencing it at the department store and then ordering the items from an alternate Web catalog. However, technological innovations that enhance UPC codes to allow retailer identity to be tagged could provide a means for charging for the shopping experience from other e-tailers who satisfy the demand. Most critically, the service of providing constrained limit orders would enhance customer loyalty.

Figure 3:
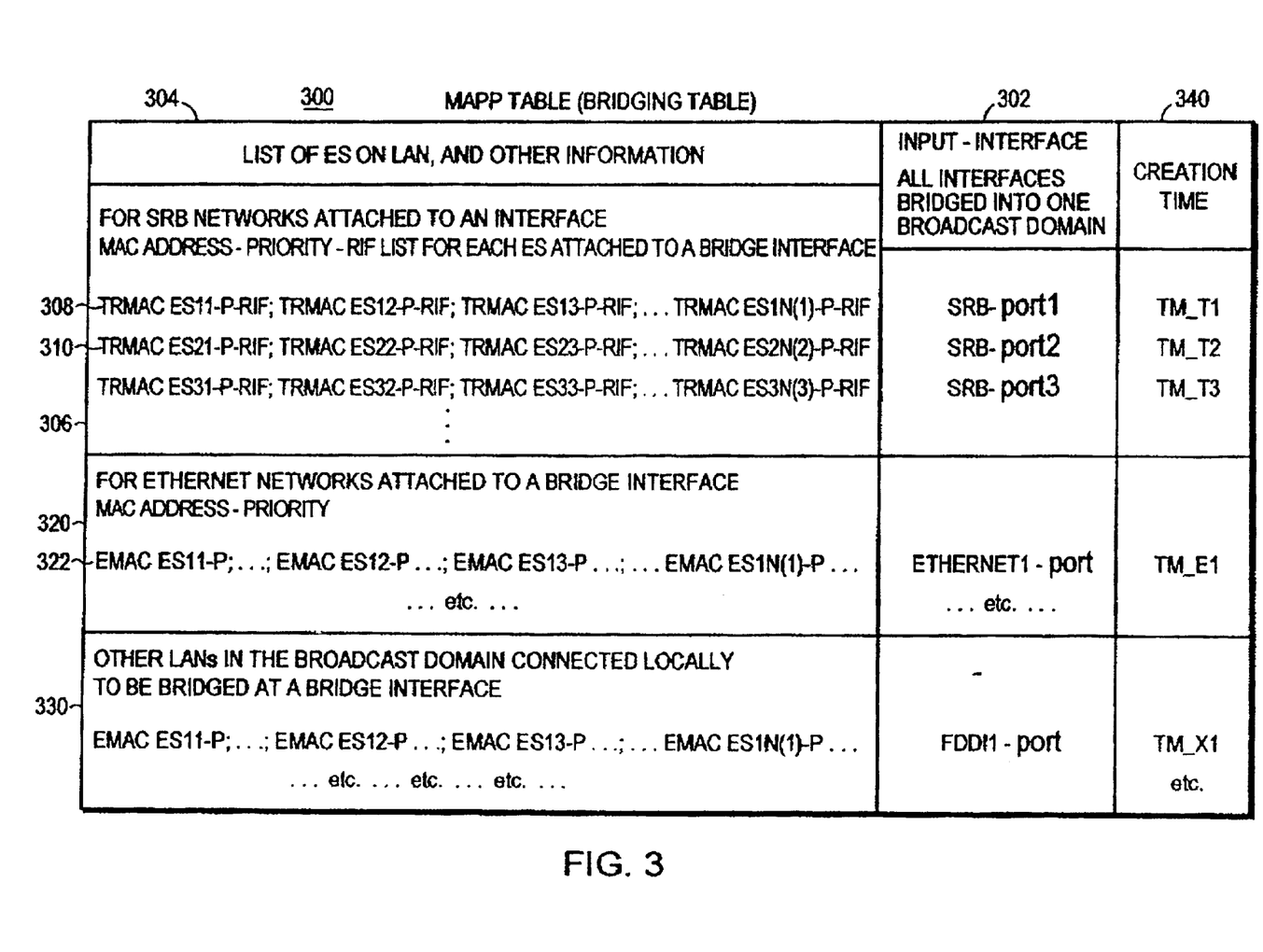
FIG. 3 is a flow chart showing the overall business process.

The process is generally illustrated in FIG. 3. The shopper 101 creates an input which is a list of item choices with constraints in function block 301. The shopper then submits the input to his or her electronic shopping assistant 104 in function block 302. The electronic shopping assistant sends out the input to one or more store servers 112 in function block 303. The store server 112 receives the input delivered over the network 110 in function block 304, and the shopping list generator running on the server creates a recommended list of products satisfying the given constraints in function block 305. The server 112 then sends back the recommended product list, indexed by recipient, in function block 306. The electronic shopping assistant 104 receives the product lists delivered over the network 110 in function block 307 and then compiles the received lists to create one or more recommended product lists in function block 308. The recommended product lists are displayed by the electronic shopping assistant to the shopper in function block 309. The shopper can now browse the lists and the online catalog 103 to tag one or more products for certain item choices in function block 310. A test is made in decision block 311 to determine if there is a tag. If not, the process goes back to function block 303 to again send input to one or more store servers 112. If, however, the shopper has tagged certain items choices, the shopper can then complete a transaction for the items recommended in the final list in function block 312.

Figure 4:
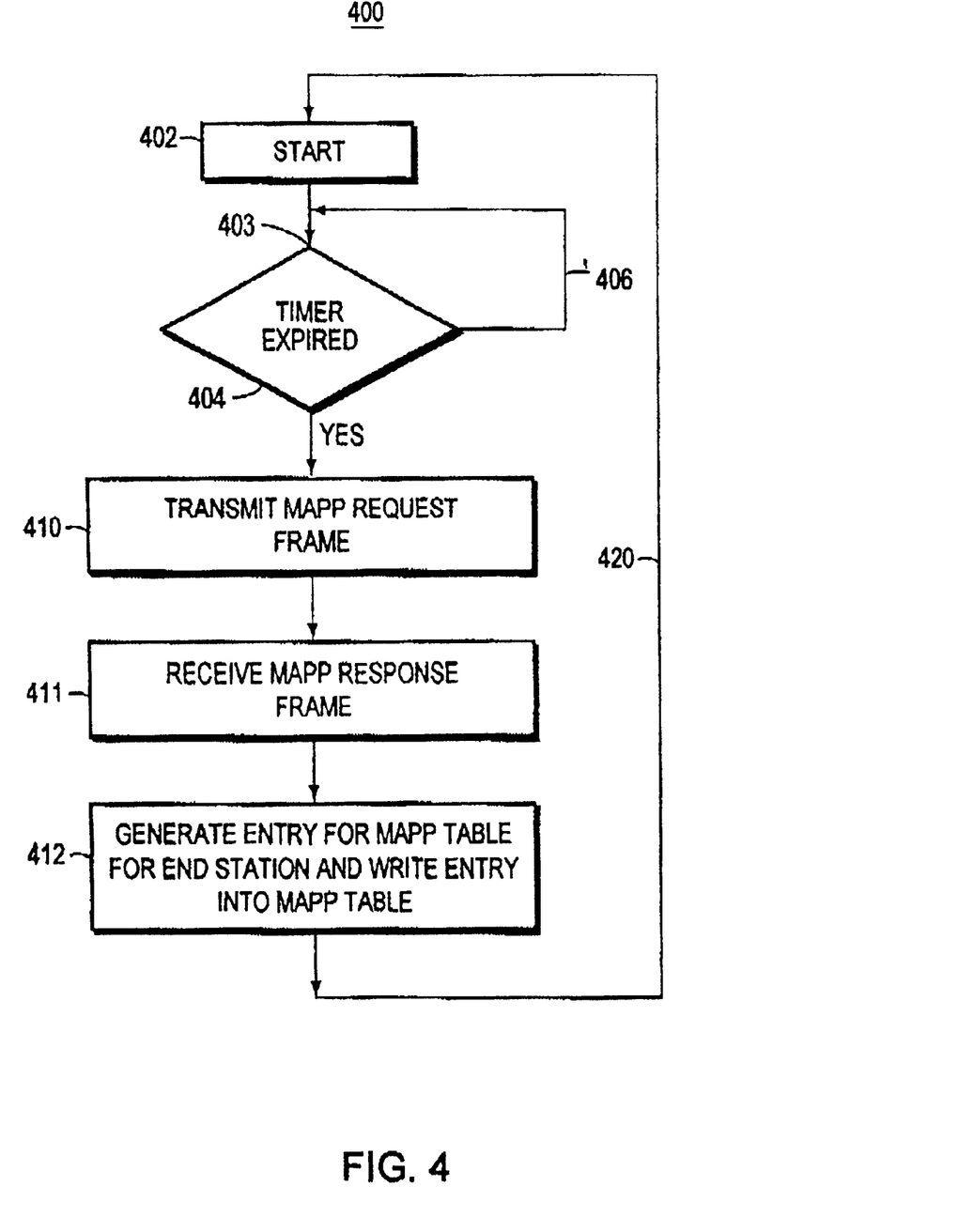
FIG. 4 is a flow chart showing the logic of the shopping list generator process which creates one or more recommended product lists.

FIG. 4 is a flow chart of the shopping list generator process implemented on a store server 112. The shopper's input profile constraints are received over the network 110 in function block 401. For the first recipient in the profile constraint list, a Structured Query Language (SQL) query is created using size, item categories and budget range in function block 402. The SQL query is submitted to the catalog database 113 in the server in function block 403. The table returned from the database is stored, indexed by recipient, in function block 404. The recipient is then removed from the shopping list in function block 405. A test is then made in decision block 406 to determine if there are any more recipients in the shopping list. If so, the process loops back to function block 402 to process the next recipient in the list; otherwise, the process provides a return to the computer 102 via the network 110.

Figure 5:
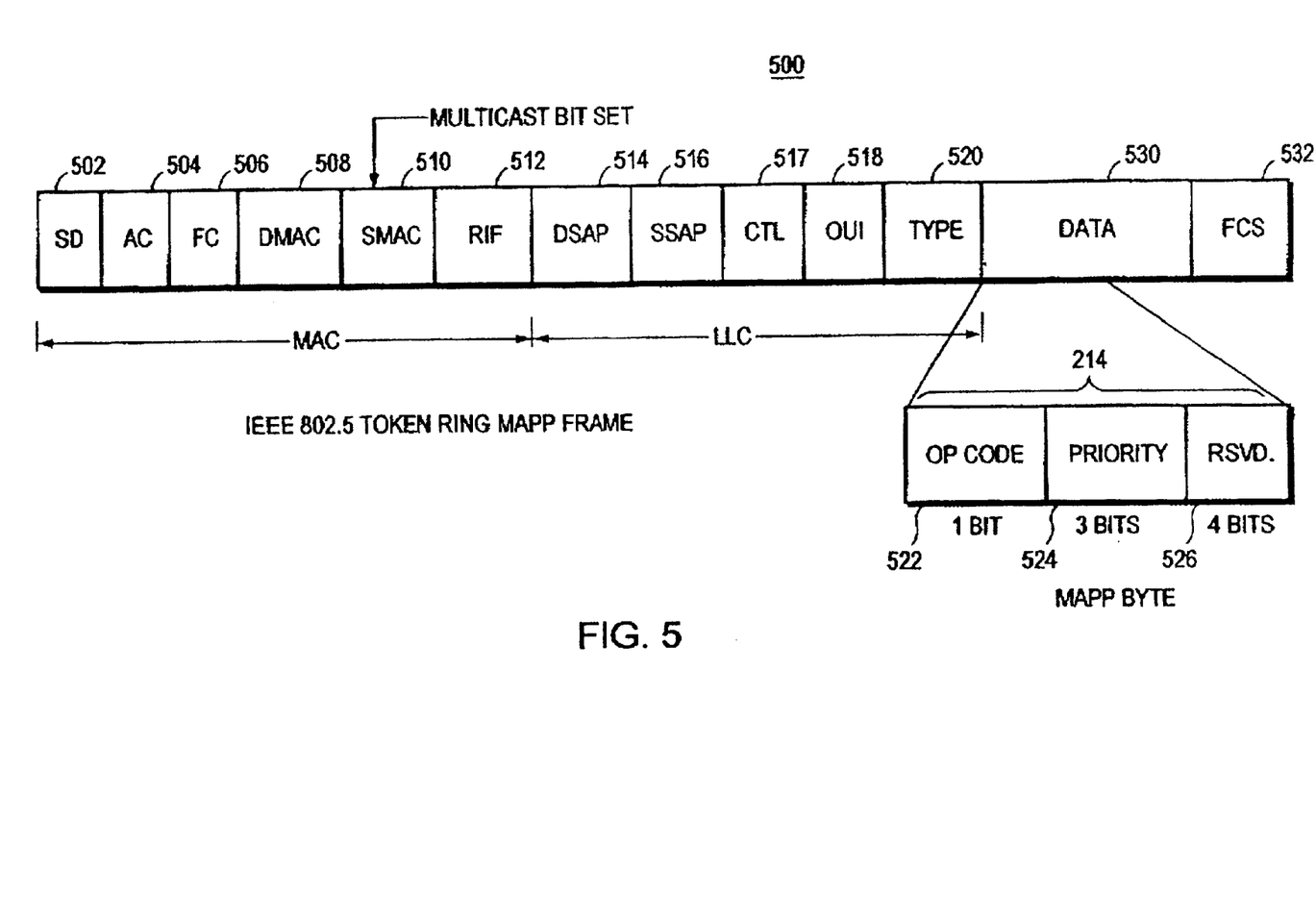
FIG. 5 is a flow chart showing the business process for generating a recommended list of products in which the list of products satisfy the profile constraints but not all combinations of choices satisfy the shopping list constraints, requiring interactive selection by the shopper.

FIG. 5 is a flow diagram of the business process for generating a recommended list of products implemented on the computer 102. Under the scenario assumed, the list of products returned by the server all satisfy the profile constraints; however, not all combinations of choices satisfy the shopping list constraints. The shopper interactively selects products and is guided by the electronic shopping assistant to make selections satisfying the shopping list constraints. The process begins by the store server 112 receiving a list of item choices with constraints submitted by the shopper from the electronic shopping assistant 104, in function block 501. For each item choice, the store server 112 selects form the electronic catalog a list of products which satisfy the constraints in the item choice profile in function block 502. The server then returns the list of products to the electronic shopping assistant in function block 503. A processing loop is entered at function block 504 which continues while there remain unselected products for some item choice. The shopper selects a particular item in function block 505. For all the remaining unselected item choices, the electronic shopping assistant 104 checks the constraints between the selected product and the unselected choices for feasibility in function block 506. In function block 507, products for item choices which are infeasible with respect to the constraints are removed form the domain of possible choices and are "greyed" out in the electronic shopping assistant's graphic user interface (GUI). A test is made in decision block 508 to determine if any item choices have no remaining products which satisfy the constraints. If so, the electronic shopping assistant 104 prompts the shopper to undo a previous choice in function block 509, and then the process loops back to function block 504. If there are no item choices having no remaining products which satisfy the constraints, a test is made in decision block 510 to determine if there are any remaining products to select. If so, the process loops back to function block 504; otherwise, processing ends.

Figure 6:
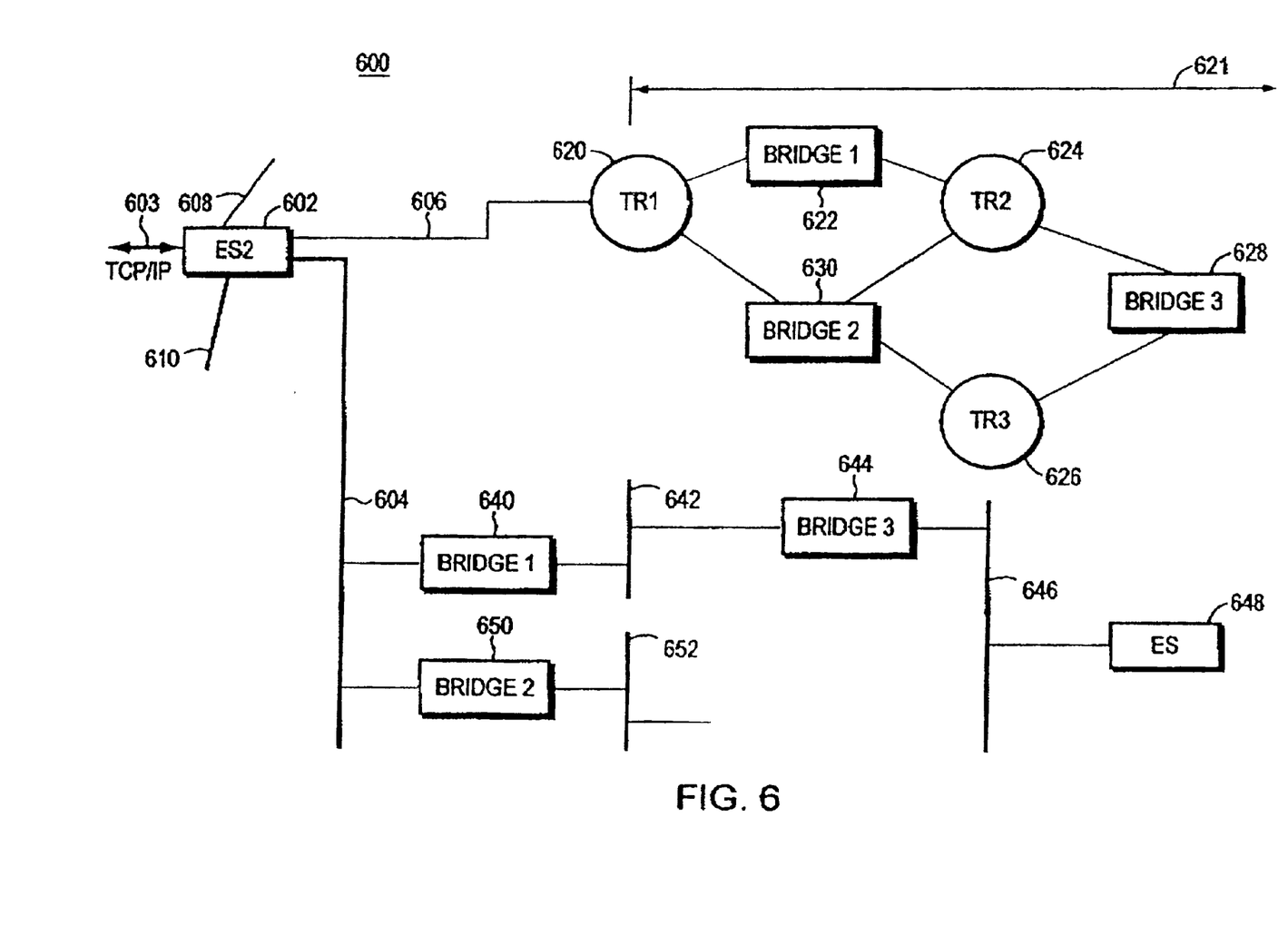
FIG. 6 is a flow chart of the business process generating a recommended list of products in which the list of products satisfy the profile constraints and all the combinations of choices satisfy the shopping list constraints, allowing the shopper to select a single combination of products.

FIG. 6 shows the business process for generating a recommended list of products as implemented on the computer 102. Under this scenario, the list of products returned by the store server 112 satisfy the profile constraints and all the combination choices satisfy the shopping list constraints. The shopper needs only to select a single combination of products. The process begins by the store server 112 receiving a list of item choices with constraints submitted by the shopper from the electronic shopping assistant 104, in function block 601. Then, in function block 602, for each item choice, the server 112 selects from the electronic catalog a list of products which satisfy the constraints in the item choice profile. This list of products is returned to the electronic shopping assistant 102 in function block 603. The electronic shopping assistant then generates a list of combinations of products which satisfy the shopping list constraints in function block 604. The list of possible combinations of products are presented to the shopper by the electronic shopping assistant 104 in function block 605. At this point, the shopper selects a combination of products in function block 606.

A typical scenario is Christmas shopping for family and friends. In this case, the electronic shopping assistant is deployed by a department store or a large specialty store, for example. The electronic shopping assistant provides assistance by generating a recommended shopping list for family and friends for whom the shopper wishes to buy presents. The electronic shopping assistant takes as input a list of gift recipients, the shopper's preferences (such as category of item for each recipient) and constraints (such as total budget), and outputs a recommended list of items for each recipient. Note that there could be more than one item for each recipient. A typical output from the electronic shopping assistant 104 looks like Table 1:

TABLE 1

Recommended Gift Alternatives Generated the Electronic Shopping Assistant

| Matt | CK Jean Vest | S | Blue | 1 | Apparel | 48.5 |
|---|---|---|---|---|---|---|
| | CK Khakis Pants | 30 × 30 | Khaki | 1 | Apparel | 35 |
| | Sperry Cotton Shoes | 9M | White | 1 | Apparel | 40 |
| | Club Room Twill Short | 30 | Stone | 1 | Apparel | 25 |

TABLE 1-continued

Recommended Gift Alternatives Generated
the Electronic Shopping Assistant

| Sarah | Supplex Sleeveless Top | S | Black | 1 | Apparel | 55 |
| | V-neck Rosette Cardigan | S | Blue | 1 | Apparel | 49 |
| | Armani Eau de Toilette | | | 1 | Fragrance | 26 |
| Tommy | Oshkosh Denim Shorts | 2T | Blue | 1 | Apparel | 28.5 |
| | Carter Shirt for Boys | 2T | Red | 1 | Apparel | 22 |
| | Leggo Construction Truck | | | 1 | Toy | 24.95 |

Another scenario is shopping to remodel parts of a home, say a kitchen. In this case electronic shopping assistant is deployed by a home improvement store. The electronic shopping assistant takes as inputs the list of categories of items needed (such as kitchen sink, faucet, kitchen cabinet, cooking range), the shopper's preference (such as color), and constraints (such as total budget), and outputs a recommended list of items for each category.

The features of the electronic shopping assistant are described in detail next.

Feature 1

The input required to create the recommended shopping list is a list of item choices with their profiles, and the shopping list constraints. In the Christmas shopping example, the list of item choices is the list of gift recipients; in the kitchen remodeling example, the list of item choices is the list of item categories needed. The profile for each item choice is a set of attributes, known in the electronic product catalog, that characterize the target item. The profiles essentially constrain each of the item to a certain set of choices. For the former example, the input screen of the item choices with their profiles would look like Table 2:

TABLE 2

Input Profiles for Item Choices

| Recipient | Gender | Age | Size | Preferred Item Category | Budget Range |
|---|---|---|---|---|---|
| Sarah | Female | 31 | Small | Apparel, Fragrance | 25–60 |
| Matt | Male | 37 | Medium, 30 × 30 | Apparel | 25–60 |
| Tommy | Male | 3 | 2T | Apparel, Toys | 20–40 |

The shopping list constraints are those that apply to the entire shopping list. For example, they can be specified as follows:

Shopping List Constraints
  Budget Constraints: Total Budget<110
  Product constraints: No more than 5 products in one product category
  Inter-item constraints: The price difference in gifts for Matt and Sarah<$ 10
  Multiple Choice Constraint: One gift for each person The electronic shopping assistant 104 takes these inputs, searches the product catalog 103, and performs the necessary computations to generate a recommended product list 108 consisting of a set of recommended products for each item choice, based on all constraints provided profiles and shopping list constraints). Note that the gift alternatives might be presented in forms different than that shown in Table 1. For instance, the columns might correspond to a bundle of feasible gifts which satisfy all constraints, as shown in Table 3:

TABLE 3

Feasible Gift Bundles Suggested by
the Electronic Shopping Assistant

| Matt | Sarah | Tommy | Total Cost |
|---|---|---|---|
| CK Jean Vest (48.5) | Armani Eau de Toilette (26) | Oshkosh Denim Shorts (28.5) | 102.5 |
| | | Carter Shirt (22) | 96.5 |
| | | Leggo Construction Truck (24.95) | 99.45 |
| CK Khaki Pants (35) | V-neck Cardigan (49) | Carter Shirt (22) | 106 |
| | | Leggo Construction Truck (24.95) | 108.95 |
| Club Room Shorts (25) | Supplex Top (55) | Oshkosh Denim Shorts (28.5) | 108.5 |
| | | Carter Shirt (22) | 102.5 |
| | | Leggo Construction Truck (24.95) | 105.45 |

There are two alternative ways of presenting the results of the computation:

(1) A final shopping list can be formed from randomly choosing one (or the appropriate number) of the products recommended in each of the item choices. The recommended list displayed is such that any final shopping list formed using the above procedure satisfies all constraints. This display method significantly reduces the number of products displayed but somewhat restricts the choice of the shopper.

(2) The displayed list contains more products than (1) in the following way. For each item choice, each of the products recommended satisfy the item choice profile but not all shopping lists formed using the procedure described in (1) satisfy all the shopping list constraints. That is, the choice of one product may preclude the choice of some other products even though they are included in the recommended list. We improve the usability of this type of recommended list by providing a user interface that allows the shopper to examine the effect of picking a particular item that looks attractive. For example, if the customer decides on the Supplex Sleeveless Top (55) for Sarah, then we can immediately infer that we cannot find items from Table 1 for both Matt and Tommy in a budget feasible way. The user interface "greys out" the entry for Matt and Tommy then.

Feature 2

The shopper 102 can manually tag one or more items for a specific item choice; e.g., for a particular person in the gift list, while browsing the product catalog. This facility allows the manual creation of potential gift lists, instead of using the entire product catalog. There are two alternative ways to deal with constraints:

(1) If the shopper provides the profile for the item choice before browsing and tagging, then each new item that is selected can be checked for feasibility before being added to the list. At the end of the browsing and tagging session the system will compute the recommended list (out of the manually selected list), taking into account the shopping list constraints.

(2) The second way eliminates the real time checking and performs all computation at the end of the browsing and tagging session.

Feature 3

This feature allows the shopper to use other methods described in Feature 1 and Feature 2 sequentially. For example, the shopper can input the constraints, request the system to create a recommended list automatically, then browse the recommended list and the product catalog further to tag one or more product for certain item choices, then request the system to compute a new list, and so on.

Feature 4

Given the profile for each item choice and the shopping list constraints, the system searches the product catalog and computes the recommended list. This feature allows the owner of the electronic shopping assistant (i.e., the store) to customize the computation so that the recommended list shows products in each item choice that are preferred by the store, and for those shown, they are listed in the order of the store's preference. The store's preference can be defined by many different ways, depending on the business practice of the store or the particular industry segment. For example, each product in the catalog carries a priority index (that is not shown to the shopper). The priority index is determined by the buyer typically and is dependent on factors such as profitability, on-hand inventory, or promotion strategies. The index can be set using a table such as follows:

| Gross Margin | Priority Index |
|---|---|
| >50% | 1 |
| >35% but <50% | 2 |
| <35% | 3 |

The store can choose to recommend Products that are priority 2 and above (lower priority number).

| On-hand Inventory in Weeks of Supply | Priority Index |
|---|---|
| >4 | 1 |
| >2 but <4 | 2 |
| <2 | 3 |

Another example is that the priority index is the arithmetic average of the gross margin based and the on-hand inventory based index. That is, the highest priority products to recommend to shoppers are the ones with >50% gross margin and >4 weeks of supply on-hand.

Extensions

Limit Orders

Another important new idea that is introduced in this disclosure is the placement of a "limit order" on the gift list. A limit order is an offer by the customer to buy an item at some price with an expiry date on the order. Additionally at any time the customer may cancel the order if it is still pending. The idea behind introducing a limit order is that customers might often be willing to wait for the price of an item to drop before buying it. However, it is tedious for the customer to continuously monitor the price and hence a limit order provides a facility to indicate to the retailer the price point at which he or she is willing to make a transaction for an item. The customer can put limit orders on all items along with budget constraints that indicates how the gift basket can be bundled. Typical limit order would require an additional column in Table 1 indicating the limit order price and one additional constraint which is the expiry date.

TABLE 4

Recommended Gift Alternatives Generated by the Electronic Shopping Assistant

| Name | Item | Size | Color | Qty | Type | Price | Limit Price |
|---|---|---|---|---|---|---|---|
| Matt | CK Jean Vest | S | Blue | 1 | Apparel | 48.5 | 40 |
| | CK Khakis Pants | 30 × 30 | Khaki | 1 | Apparel | 35 | 30 |
| | Sperry Cotton Shoes | 9M | White | 1 | Apparel | 40 | 25 |
| | Club Room Twill Short | 30 | Stone | 1 | Apparel | 25 | |
| Sarah | Supplex Sleeveless Top | S | Black | 1 | Apparel | 55 | 35 |
| | V-neck Rosette Cardigan | S | Blue | 1 | Apparel | 49 | 40 |
| | Armani Eau de Toilette | | | 1 | Fragrance | 26 | |
| Tommy | Oshkosh Denim Shorts | 2T | Blue | 1 | Apparel | 28.5 | 20 |
| | Carter Shirt for Boys | 2T | Red | 1 | Apparel | 22 | |
| | Leggo Construction Truck | | | 1 | Toy | 24.95 | |

The last column here indicates the limit order. Note that items which are left blank indicates that the price current price was acceptable. An additional constraint that will be added to the previous constraints list is an expiry date which specifies the date by which the order expires.

An added advantage of limit orders is for retailers. If the retailers are able to collect limit orders form a reasonable number of their customers (>1000), then they can use this information to identify the price point for various items and design promotionals based on this information. Additionally, they can identify the appropriate price at which they can sell items against.

While the invention has been described in terms of a preferred embodiment, those skilled in the art will recognize that the invention can be practiced with modification within the spirit and scope of the appended claims.

Having thus described our invention, what we claim as new and desire to secure by letters patent is as follows:

1. A computer system capable of providing a plurality of lists of product combinations to a plurality of shoppers over one or more networks, the system comprising:

one or more central processing units (CPUs), one or more memories, and one or more network interfaces to one or more networks connecting said CPUs and memories;

an electronic shopping assistant process running on said one or more CPUs, said shopping assistant process being able to receive a plurality of inputs from shoppers comprising a plurality of constraints consisting of: item choices, profile constraints, which at least comprises information regarding a plurality of recipients and the recipient information comprises at least recipient name, price limits, and shopping list constraints, which at least comprises product constraints, inter-item constraints and multiple choice constraints, send said plurality of inputs to a shopping list generating process; and receive a plurality of lists of recommended product combinations that satisfy the given constraints, and being able to allow shoppers to view and select one or more product combinations from received lists, said constraints of a shopper being applied to a group of products and said product combinations being responsive to said group of products;

a shopping list generating process running on said one or more CPUs, said list generating process being able to receive said plurality of inputs from the electronic shopping assistant process over said one or more networks by using an electronic shopping list protocol, being able to search products in an online product catalog stored in a product database, being able to compute a plurality of lists of product combinations that constraints given in the input, each said list providing one or more products for each of said plurality of recipients, and being able to send lists of product combinations back to the electronic shopping assistant process again by using the electronic shopping list protocol, wherein at least one of said constraints is a shopping list constraint applicable to an entire shopping list comprised of a combination of products, and wherein said computation optimizing said constraints incorporates product preferences of a merchant.

2. A computer system capable of providing a plurality of lists of product combinations to a plurality of shoppers over one or more networks, as recited in claim 1, wherein the profile constraints provide information about a plurality of recipients of products for which the shopper shops, the recipient information comprising an identification including name, gender, age and address, and product information including category, size, color and brand, and budget information.

3. A computer system capable of providing a plurality of lists of product combinations to a plurality of shoppers over one or more networks, as recited in claim 1, wherein the shopping list constraints comprise one or more budget constraints that specify one or more conditions on a cost for individual product recipients and a total cost, one or more product constraints that specify one or more conditions for product attributes including category, size, color and brand, one or more inter-item constraints that specify one or more conditions on a relationship among products and their attributes, and one or more multiple choice constraints that specify one or more conditions on a number of products given to recipients.

4. A computer system capable of providing a plurality of lists of product combinations to a plurality of shoppers over one or more networks, as recited in claim 1, wherein the limit price is an offer by a shopper to buy a product item at a suggested price with an expiry date.

5. A computer system capable of providing a plurality of lists of product combinations to a plurality of shoppers over one or more networks, as, recited in claim 1, wherein the electronic shopping assistant process includes an input handling process that is able to receive a plurality of inputs of constraints from shoppers, and sends out the inputs to one or more shopping list generating processes in one or more online stores.

6. A computer system capable of providing a plurality of lists of product combinations to a plurality of shoppers over one or more networks, as recited in claim 1, wherein the electronic shopping assistant process includes an output handling process that is able to receive a plurality of lists of product combinations that satisfy the given constraints, and allows shoppers to view and select one or more product combinations from received lists.

7. A computer system capable of providing a plurality of lists of product combinations to a plurality of shoppers over one or more networks, as recited in claim 5, wherein each list of product combinations comprises products sold in one or more online stores that satisfy the constraints given by the electronic shopping assistant as a set.

8. A computer system capable of providing a plurality of lists of product combinations to a plurality of shoppers over one or more networks, as recited in claim 1, wherein the online product catalog includes one or more product identification numbers, a product name, one or more product categories, one or more product attribute values including product size, product color, product price, product gross margin percentage, on-hand inventory in weeks of supply, and product preferences of a merchant, including one or more priority indices including priority index by margin, priority index by inventory, and an overall priority index.

9. A computer system capable of providing a plurality of lists of product combinations to a plurality of shoppers over one or more networks, as recited in claim 7, wherein the priority index of a product is an attribute of a product that represents a store's preference for selling in comparison to other products in the store.

10. A computer system capable of providing a plurality of lists of product combinations to a plurality of shoppers over one or more networks, as recited in claim 1, wherein the product database stores one or more product identification numbers, one or more product records, each of which stores one or more product identification numbers, one or more product names, one or more product categories, one or more product attribute values including product size, product color, product price, product gross margin percentage, on-hand inventory in weeks of supply, and said product preferences of a merchant include one or more priority indices including priority index by margin, priority index by inventory, and an overall priority index.

11. A computer system capable of providing a plurality of lists of product combinations to a plurality of shoppers over one or more networks, as recited in claim 1, wherein the shopping list generating process is a component of the electronic shopping assistant process that searches products in an online product catalog stored in a product database, is capable of computing a plurality of lists of product combinations that satisfy the constraints given in the input.

12. A computer system capable of providing a plurality of lists of product combinations to a plurality of shoppers over one or more networks, as recited in claim 1, wherein the electronic shopping assistant process list protocol is capable of allowing the sending and receiving of a plurality of inputs of constraints and a plurality of outputs of list of recommended product combinations, between one or more electronic shopping assistant processes and one or more shopping list generating processes over one or more networks.

13. A computer system capable of providing a plurality of lists of product combinations to a plurality of shoppers over one or more networks, as recited in claim 1, wherein the electronic shopping assistant process is able to compile a plurality of lists of recommended product combinations received from one or more stores, to create one or more recommended product lists.

14. A computer system capable of providing a one or more plurality of lists of product combinations to a plurality of shoppers over one or more networks, as recited in claim 1, wherein the electronic shopping assistant process is capable of displaying a plurality of lists of recommended product combinations to shoppers.

15. A computer system capable of providing a plurality of lists of product combinations to a plurality of shoppers over one or more networks, as recited in claim 1, wherein the electronic shopping assistant process provides an interactive interface for a shopper allowing the shopper to browse one or more lists of feasible product bundles with products presented in one or more online product catalogs, and tag one or more products in the lists and the catalog.

16. A computer system capable of providing a plurality of lists of product combinations to a plurality of shoppers over one or more networks, as recited in claim 14, wherein a shopper submits an input including one or more products tagged from the online product catalog and the feasible product bundles in a previous submission.

17. A computer system capable of providing a plurality of lists of product combinations to a plurality of shoppers over one or more networks, as recited in claim 1, further comprising a handheld shopping assistant equipped with a code scanner which a shopper uses to select one or more products of interest in his or her shopping basket.

18. A computer system capable of providing a plurality of lists of product combination to a plurality of shoppers over one or more networks, as recited in claim 16, wherein the shopping basket is a computer program that operates in the handheld shopping assistant and records information about products scanned by the handheld shopping assistant's code scanner.

19. A computer system capable of providing a plurality of lists of product combinations to a plurality of shoppers over one or more networks, as recited in claim 17, wherein the product information includes, for each product, one or more product information numbers, one or more product names, one or more product categories, one or more product attribute values including product size, product color, and product price.

20. A computer system capable of providing a plurality of lists of product combinations to a plurality of shoppers over one or more networks, as recited in claim 18, wherein a shopper prepares one or more inputs to one or more electronic shopping assistant processes by using product information recorded in his or her handheld shopping assistant's shopping basket.

21. A computer implemented method capable of generating a plurality of recommended shopping lists over a network comprising the steps of: preparing by a shopper inputs to a computer network interface comprising a plurality of constraints consisting of: item choices, profile constraints, which at least comprise information regarding a plurality of recipients and the recipients information comprises at least recipient name, price limits, and shopping list constraints, which at least comprise product constraints, inter-item constraints and multiple choice constraints, said method being capable of receiving a plurality of said inputs from said shopper;

sending said inputs over the network to one or more stores, by using an electronic shopping list protocol;

computing lists of recommended product combinations optimizing the constraints in the input, said method being capable of computing a plurality of said lists; and receiving the lists of recommended product combinations over the network, displaying products in the lists, and resending one or more new inputs to one or more stores over the network, wherein said inputs of a shopper apply to a group of products and said product combinations are responsive to said group of products, and wherein at least one of said constraints is a shopping list constraint applicable to an entire shopping list comprised of a combination of products, and wherein said computation optimizing said constraints incorporates product preferences of a merchant.

* * * * *